United States Patent Office 3,519,584
Patented July 7, 1970

3,519,584
VINYL HALIDE POLYMERS STABILIZED WITH MIXTURES COMPRISING A METAL PHENATE-PHOSPHITE AND A METAL CARBOXYLATE-PHOSPHITE
Gordon M. Juredine, Cleveland Heights, Ohio, assignor to Synthetic Products Company, Cleveland, Ohio, a corporation of Ohio
No Drawing. Continuation-in-part of applications Ser. No. 510,424, Oct. 18, 1965, and Ser. No. 615,860, Sept. 15, 1966. This application Dec. 5, 1966, Ser. No. 599,416
Int. Cl. C08f 45/58, 45/62
U.S. Cl. 260—23                                24 Claims

ABSTRACT OF THE DISCLOSURE

Asymmetric alkaline earth metal phenate-phosphites are prepared by reacting a dispersion in high boiling organic liquid of an oxide of a polyvalent metal with equal molar amounts of a phenol (including substituted phenols and thiophenols) and with an organic phosphite having at least one aryl group in addition to two organic substituents of 4 to 18 carbon atoms, 0.1 to 10 parts of product are incorporated into various high polymers (for example PVC) to provide stabilization without the undesirable plate-out, haze formation, and other disadvantages obtained with alkaline earth metal carboxylates and/or phenates alone or in conjunction with prior art phosphites. Carboxylic salts of cadmium, tin, etc. may also be present. The composition is also advantageous in oils, fuels, etc.

---

This application is a continuation-in-part of my copending application Ser. Nos. 510,424 and 615,860, filed respectively on Oct. 18, 1965 and Sept. 15, 1966 which issued as United States Letters Pats. Nos. 3,321,499 and 3,356,617 on May 23, 1967 and Dec. 5, 1967, respectively. This invention relates to compounds useful for the stabilization of high polymers, particularly vinyl halide polymers, to methods or processes of making said compounds, to compositions including said compounds, and to products such as high polymers stabilized with said compounds and compositions. More particularly, it relates to asymmetric alkaline earth metal phenate-phosphites, to methods of making said phosphites, to compositions including a combination of asymmetric alkaline earth metal carboxylic-phosphites and said asymmetric phenate-phosphites, and to vinyl halide polymers stabilized with said combination of asymmetric phosphites.

An important utilization of alkaline earth metal salts is in the field of vinyl halide resin additives, where alkaline earths are used rather generally as stabilizers or as components with other materials in stabilizing systems for vinyl resins in the form of carbozylates. These alkaline earth carboxylates produce along with their important stabilizing effects of the metal a more or less degree of incompatibility due to the heretofore unavoidable excess of carboxylate that accompanies the metal, in the vinyl resin compound during its processing and in the finished vinyl plastic product, as evidenced by the migration of unassimilated carboxylate to the surfaces of the vinyl resin compound during curing and processing to cause undesirable plate-out on the carrying equipment and to cause undesirable scum that exudes on exposure and aging of the vinyl plastic to weathering, and to cause undesirable surface interferences to decorative or utile printing an to heat-sealing of the vinyl plastic.

The plate-out is noticed as a mist or as deposits on molds or calender rolls producing molded objects or sheets having imperfect surfaces and requiring a considerable amount of undesired cleaning of molds, casting surfaces, calender rolls and the like. This trouble is due to the presence of two molecular equivalents of carboxylic acid for each mole of alkaline earth metal used as stabilizer. This amount is always an excess over what can apparently be contained compatibly with the needs for the amount of alkaline earth metal by the requirements to stabilize the vinyl resin during processing or in the finished plastic.

Alkaline earth metal phenates have also been used in admixture with the carboxylates to accomplish similar results, as well as sometimes an increased benefit. These phenates, while more compatible with the resins than the carboxylates, also tend to plate-out to an undesirable extent.

Formulators and compounders in the vinyl industry have been obliged to contend with this problem whenever they required the presence of an alkaline earth stabilizer, and have made recourse to tedious and complicated correctives to overcome it, not always with assurance of success. If the resin is fused and cured at 350 to 400° F. or higher, the plate-out is reduced. However, this requires exacting control which is very often impractical in factory operations, and such temperatures even for short times result in some degradation of the vinyl polymer, even under the best conditions.

In my prior applications, I showed that the difficulties were avoided by making and incorporating into high polymers, such as polyvinyl chloride, an asymmetric alkaline earth metal carboxylate-phosphite of the general formula,

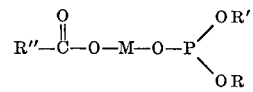

where R and R" are selected from alkyl, cycloaliphatic, aryl, aralkyl and alkaryl radicals, and where R has four to 18 carbon atoms.

It is a primary object of the present invention to avoid the difficulties alluded to hereinabove and to provide a new alkaline earth phenate stabilizer compound for vinyl halide polymers which does not exhibit plate-out over an extended period of time and which does not exhibit undesirable surface scum nor intereferences to printing or heat-sealing.

Another object of this invention is to provide novel methods for making these alkaline earth metal phenate compounds.

Yet another object is to provide compositions useful for stabilizing vinyl halide polymers and including a novel alakline earth metal phenate stabilizer compound.

A still further object is to provide a new composition of a vinyl halide polymer containing said alkaline earth metal phenate compound as a stabilizer and which does not exhibit undesirable plate-out, surface scum or weathering, nor interference to printing or heat-sealing.

These an other objects and advantages of the present invention will become more apparent to those skilled in the art from the following detailed description and examples.

According to the present invention, it has been discovered that vinyl halide polymers can be heat-stabilized in a superior manner with a combination or mixture of asymmetric alkaline earth metal carboxylic-phosphites and of an asymmetric alkaline earth metal phenate-phosphite, of the general formula,

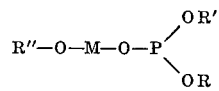

where M is an alkaline earth metal (Ca, Ba, or Sr), preferably Ba, R and R' have four to eighteen carbon atoms and are selected from the group consisting of alkyl, such as butyl, octyl and hexadecyl; aryl, such as phenyl and napthyl; cycloaliphatic such as cyclohexyl; aralkyl, such as benzyl, nonylphenyl; and alkaryl, such as phenylnonyl radicals and their halogen-substituted derivatives; and R″—O— is selected from the group consisting of radicals of phenol, substituted phenol, thiophenol, and substituted thiophenol. Substituted phenols include the various chlorophenoyls, including the ortho, meta and para chlorphenols, the various aminophenols, including para-aminophenol, the various methoxy phenols, including meta and para methoxy phenols, the alkyl-substituted phenols, such as nonyl and octyl phenols, the cresyls and substituted cresyls, such as nonylcresyl, and the corresponding substituted-thiophenols. The substituents in the phenol radical may have up to a total of nineteen carbon atoms, of which a maximum of eighteen may be in one alkyl group. Moreover, vinyl halide polymers stabilized with a mixture of one or more of these asymmetric alkaline earth metal phenate-organic phosphite compounds, and one or more of the asymmetric alkaline earth carboxylate-phosphites do not exhibit plate-out over extended periods of time, do not show surface scum nor feel slimy to the touch after aging, and do not exhibit undesirable surface interference to satisfactory surface printing or heat-sealing as compared to vinyl halides polymers containing the usual alkaline earth metal carboxylic acid salt and/or alkaline earth metal phenate, alone or with an organic phosphite.

There is a synergistic effect on the carboxylate-phosphite by the phenate-phosphite and vice versa. An especially large quantity of the mixture may be used without plate-out and improved stabilization is also obtained with a smaller total quantity.

Thus, the problems alluded to hereinabove are avoided when these asymmetric alkaline earth metal phenate-phosphites, together with some alkali metal carboxylate-phosphite compounds are employed in vinyl halide polymers as stabilizers or are employed in conjunction with other materials, such as conventional polyvinyl halide stabilizers of the class of cadmium, zinc and/or tin salts of organic acids, with or without organic phosphites, to form stabilizing systems for vinyl halide polymers. Such asymmetric metal phenate-phosphites contain only about half of the phenol radical content heretofore accompanying the alkaline earth metal.

Although the reaction to produce these asymmetric phentae-phosphites appears to be almost quantitative, it, of course, is possible that side reactions can occur or that the reactants may not have completely reacted, and also small amounts of raw materials may be present, including some alkaline earth metal hydroxide, free phosphite and free phenol. Such small residues are fully compatible for practical purposes during the processing of the vinyl resin and during aging of the vinyl plastic. The selected phosphites employed in the other half of the asymmetric alkaline earth metal salts and phenates to balance the requirement of the alkaline earth metal valency are known to be in themselves compatible in vinyl resins. Mixtures of these new asymmetric stabilizers can be used as well as mixtures of these with asymmetric alkaline earth metal carboxylate-phosphites, and/or with small amounts of alkaline earth metal carboxylates and/or some small amounts of organic phosphites.

Examples of these asymmetric alkaline earth metal phenate-phosphite compounds falling within the scope of this invention are barium phenate-diphenyl phosphite, barium nonylphenate-diphenyl phosphite, barium chlorophenate-dibutyl phosphite, barium octylphenate-ditolyl phosphite, barium butylphenate-benzyl methyl phosphite, barium cresylate-phenyl tolyl phosphite, barium hexyldecyl-cyclopentyl phenyl phosphite, barium thiophenate-diiodophenyl phosphite, barium nonylphenate-octyl phenyl phosphite, barium hexylphenate-diphenyl phosphite, barium octylphenate-octylphenyl phosphite, barium nonylphenate-bis(nonylphenyl phosphite, barium orthononylphenate-dicyclohexyl methyl phosphite, barium aminophenate-difluorobutyl phosphite, barium dodecylphenate-butylphenyl phosphite, barium thiophenate-ditolyl phosphite, barium metanonylphenate-tridecyl phenyl phosphite, barium nonylthiophenate-octylphenyl phosphite, barium phenate-di-phenyl phosphite, barium methoxyphenate-bis(nonylphenyl) phosphite, barium phenate- bromohexyl tolyl phosphite, barium paracresylate-diphenyl phosphite, barium phenate, octyl phenyl phosphite, barium thiophenate-dicyclopentyl phosphite, barium paranonylphenate - bis(dodecylphenyl)phosphite, the corresponding calcium and the corresponding strontium compounds, and the like.

The example of alkaline earth metal carboxylate-phosphites are set forth in my above-designated application Ser. No. 510,424, which is hereby incorporated herein and made a part hereof by reference.

These asymmetric alkaline earth metal phosphite phenates can readily be prepared by dispersing in a particular diluent and/or solvent (preferably boiling above 300° F.) the alkaline earth metal hydroxide [$Ba(OH)_2$, $Ca(OH)_2$, or $Sr(OH)_2$, or mixture thereof including their hydrates] and then the required phenol (or thiophenol) is mixed in this dispersion at room temperature. The temperature is then preferably elevated to above 220° F., generally 250 to 300° F., for a few minutes to accelerate the combination of alkali metal and phenol. The mixture is then preferably cooled somewhat, say to about 210° F. or so and the desired organic phosphite added. When the exothermic reaction started reaches its peak, external heat is preferably applied to maintain a temperature of around 250 to 300° F. for a few minutes, agitation is stopped, the batch cooled somewhat and filtered. The solution contains the asymmetric alkaline earth phenate-phosphite.

The mixture of asymmetric alkaline earth metal phenate-phosphite and alkaline earth metal carboxylate-phosphite may be made by separately mixing the preformed components, or it may be formed in situ by reacting a mixture of the carboxylic acid and the phenol with the alkaline earth metal hydroxide. As little as 5% of asymmetric carboxylate-phosphite in the mixture consisting of the alkaline earth metal phenate-phosphite and alkaline earth metal carboxylate-phosphite improves the performance of the stabilizer over a stabilizer consisting of the latter alone. Superior results are obtained with a greater proportion of the caboxylate-phosphite and generally 25% to about 75% is used. I prefer about equal parts of the two components. As little as 5% of the phenate-phosphite improves the performance over the carboxylate-phosphite alone.

In some instances it may not be necessary to apply external heat to the mixture. However, for practical usage, to speed the reaction and to increase the fluidity of the mass, heat is generally applied to the mixture. Temperatures, thus, can be from about 50 to 400° F. Preferred temperatures are from about 85 to 300° F. Although somewhat higher temperatures can be employed, temperatures should not be so high as to cause volatilization or degradation of the reactants, diluents and/or solvents, or products.

At the end of the above reaction, the asymmetric alkaline earth metal phenate-phosphite can be separated readily from the other materials present. However, this is not generally necessary since the small amount of water present, if not evolved during the reaction, is not deleterious in the vinyl halide polymer and in many instances will be removed during compounding and processing. Also, the water can be bound to or complexed with any free phosphite and sometimes with the asymmetric alkaline earth metal phenate-phosphite. The phenols produced are compartible with the vinyl halide polymers and may afford some antioxidant activity. Where diluents such as hydrocarbons and/or ethers are employed, these are also compatible with the vinyl halide polymers and can be retained.

In general, the organic phosphite, phenol plus organic acid, and alkaline earth metal hydroxide are used in substantially, preferably in essentially equal, molar quantities. For example, in preparing the phenate-phosphite alone, the reaction can proceed as follows:

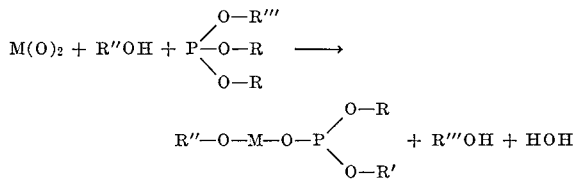

M, R, R' and R" have the same significance as indicated supra; R''', however, is always selected from the group consisting of aryl and alkaryl radicals. When the mixture is prepared in situ and equal molar quantity of the acid or acids is substituted in the above for part of the phenol.

In preparing these asymmetric stabilizers, special equipment is not ordinarily required. The reactants may simply be reacted in a vessel open to the atmosphere or if desired under reflux. Inert atmospheres and so forth are not usually required. Agitation is desirable during at least a portion of the reaction. Since some of the materials used in the preparation may be flammable, such as the diluents, precautions should be observed by using water baths or steam for heating. If the exothermic heat of reaction becomes too high, cooling means should be provided.

The mixture of asymmetric alkaline earth metal phenate-phosphite and alkaline earth metal carboxylate-phosphite is mixed with the vinyl halide polymer only in a minor amount by weight, alone or with other known stabilizers, sufficient to heat-stabilize the vinyl halide polymer. In general, there can be used from about 0.1 to 10 parts by weight of the asymmetric alkaline earth metal phenate-phosphite stabilizer of the present invention based on 100 parts by total weight of the vinyl halide polymer.

Organic phosphites for use in the practice of the present invention have the following general formula:

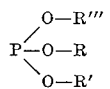

In the formula, R and R' are selected from the group consisting of alkyl, cycloaliphtic, aryl, aralkyl, and alkaryl radicals and their halogen-substituted derivatives having from 4 to 18 carbon atoms; and R''' is selected from the group consisting of aryl and alkaryl radicals and their halogen-substituted derivatives having from 6 to 18 carbon atoms. Mixtures of these phosphites can be used. Examples of phosphites falling within this formula are dibutyl phenyl phosphite, diheptyl phenyl phosphite, butyl diphenyl phosphite, isobutyl diphenyl phosphite, hexyl diphenyl phosphite, amyl ditolyl phosphite, triphenyl phosphite, octyl diphenyl phosphite, tri(nonylphenyl) phosphite, trixlyl phosphite, dibenzyl phenyl phosphite, dicyclopentyl phenyl phosphite, di(cyclohexyl methyl) phenyl phosphite, di(cyclopentyl propyl)tolyl phosphite, monochlororodecyl diphenyl phosphite, trichlorophenyl phosphite, tribromo-octyldecyl ditolyl phosphite, tetrafluoro-octyl diphenyl phosphite, di(monofluoro-octyl) naphthyl phosphite, dodecyl diphenyl phosphite, nonyl diphenyl phosphite, tetradecyl ditolyl phosphite, and so forth. It is preferred that the halogen derivatives be monohalogen-substituted, and more preferably, be monochloro-substituted. The organic phosphites are well-known to the art. They can readily be derived from mixtures of alcohols and phenols, substituted phenols, and so forth, by reaction with phosphorous trichloride and separating the resulting organic chloride from the organic phosphite.

Diluents can be one or more inert, relatively high boiling point hydrocarbons and/or ethers and mixtures of the same which are liquid at the reaction temperatures and which perform the function of diluent as well as solvent. Examples of the ethers and hydrocarbons which may also act as plasticizers in the vinyl halide polymer are tripropylene glycol methyl ether, ethylene glycol monoethyl ether, ethylene glycol phenyl ether, ethylene glycol monomethyl ether, ethylene glycol monobutyl ether, diethylene glycol monomethyl ether, diethylene glycol monoethyl ether, diethylene glycol monobutyl ether, propylene glycol methyl ether, dipropylene glycol methyl ether, ethylene glycol para (sec.) butyl phenyl ether, ethylene glycol para (tert.) butyl phenyl ether, dipropylene glycol phenyl ether, propylene glycol ortho chlorophenyl ether, propylene glycol para (sec.) butyl phenyl ether, propylene glycol ortho (sec.) butyl phenyl ether, propylene glycol para (tert.) butyl phenyl ether, propylene glycol 4-biphenyl ether, propylene glycol p-cyclohexyl phenyl ether, propylene glycol p-chloro phenyl ether, propylene glycol 2,4-dichlorophenyl ether, benzyl butyl ether, diethylene glycol diethyl ether, 2-butoxy toluene, 1-phenoxy heptane, octyl ether, toluene, cycloheptane, 3-methyl octane, ethyl benzene, the xylenes, cumene, undecase, tetralin, anisole, ter. amyl benzene, diethyl benzene, isohexyl benzene, 3-methyl biphenyl, 1,3-dimethyl cyclohexane, 2,6-dimethyl heptane, dodecane, octane, pentadecane, and so forth, and mixtures thereof. These diluents and/or solvents should have a boiling point of at least 230° F. For best results a mixture of the hydrocarbon and ether diluent and/or solvent should be used. Excess phosphite can be used to speed the reaction and serves to some extent as a diluent but does not avoid the necessity for using an ether and/or hydrocarbon diluent. When ethers are used alone as diluent, it is desirable to have a mixture of relatively high and low boiling point ethers. Likewise, when hydrocarbons are being used alone, a mixture of relatively high and low boiling point hydrocarbons should desirably be employed. These solvents and/or diluents are employed in an amount sufficient to give the desired fluidity and solvency to the reaction mass and to facilitate handling. In general, the amount of diluent may vary from about 20 to 80% by weight of the reaction mixture. The use of these diluents, also, aids in later mixing the asymmetric stabilizers with the resin, plastisols and so forth.

An alternative method for making the asymmetric alkaline earth metal phenate-phosphites is to react the starting materials in stages. This is somewhat less desirable since extra steps and extra heat are involved and sometimes the final product exhibits plate-out after extended use because of poor reaction efficiency and because more of a mixture is obtained rather than an asymmetric compound. However, such method may be more convenient to employ for some manufacturing purposes and end uses. For example, the alkaline earth metal hydroxide and the phenol are reacted in the diluent as follows:

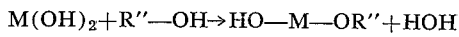

where R" and M have the significance as defined supra. The water may or may not be separated from the resulting product. The "mixed" half phenate of the metal (i.e. basic barium phenate, basic strontium phenate, basic calcium phenate, and so forth, corresponding to the foregoing metal hydroxides and phenol) is then reacted with the desired organic phosphite as follows:

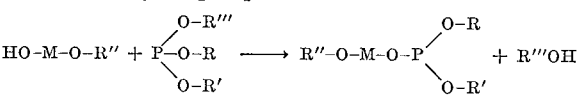

where M, R, R', R" and R''' have the significance as defined above. The basic alkaline earth phenate can be obtained by the method as shown above or by any other method known to those skilled in the art. The mol ratios employed and the temperatures used are essentially the same as shown supra.

Polymers to be stabilized with the stabilizers of this invention can be any vinyl halide polymer obtained by polymerizing a polymerizable vinyl halide monomer, including mixtures of these monomers, such as vinyl fluoride, vinyl chloride, and vinyl bromides, and copolymers of a major (total) amount of one or more of these vinyl halide monomers and a minor amount, preferably not over 15%, of at least one other copolymerizable monomeric material having from one to two polymerizable $H_2C=C<$ groups. Examples of monomers copolymerizable with these vinyl halide monomers in minor amounts are vinyl acetate, vinylidene fluoride, vinylidene chloride, vinylidene bromide, allyl alcohol, 3-butene-1-ol, phenyl vinyl ether, allyl acetone, diallyl malonate, diallyl malate, diallyl phthalate, divinyl ether, trichlorofluoro-ethylene, diallyl ether, acrylonitrile, methacrylonitrile, chloroacrylonitrile and the like, and mixtures thereof. It is understood that the term "polymer" includes copolymer, interpolymer, terpolymer and graft polymer, etc. Mixtures of these polymers, copolymers, and the like, can be used. Preferred are polymers prepared from vinyl chloride, or a major amount by weight of vinyl chloride and a minor amount by weight of vinylidene chloride or vinyl acetate, for example a polymer of from about 86% to 98% by weight of vinyl chloride and from about 14% to 2% by weight of vinyl acetate. The vinyl halide monomers have the formula

where X is fluorine, chlorine or bromine.

These polymers can be obtained by bulk, emulsion, solution or suspension polymerization by procedures well-known to the art. The polymers to be stabilized can be any one or more of the calender grade, plastisol grade, coating grade, blotter type resins and so forth.

These stabilized vinyl halide polymers, furthermore, can be plasticized with well-known plasticizers such as dioctyl phthalate, tricresyl phosphate, the nonmigratory polyester plasticizers, the Paraplexes, di-2-ethyl butyl azelate, dipropylene glycol dibenzoate, chlorinated biphenyl, epoxy-type plasticizers, triethylene glycol di-(2-ethyl hexoate), chlorinated paraffin, n-butyl acetyl ricinoleate, butyl acetoxy stearate, and others well-known to the art. Other stabilizers, antidegradants (antioxidants), ultraviolet absorbers, fillers, rubbers, resins, pigments, dyes, fungicides and other compounding ingredients can be mixed and blended with these polymers as is customary in the art. Examples of the same are epoxidized soybean oil and other epoxidized oils and esters, the orthohydroxy benzophenones, the alkylated 2-hydroxy phenyl benzotriazoles, aryl amines, alkylated phenols, 2,6-ditertiary butyl paracresol, carbon black, titanium dioxide, magnesium oxide, antimony oxide, silica, calcium silicate, phthalocyanine blue or green, mica, wood cellulose, glass fibers, metal flakes, styrene-acrylonitrile copolymers, butadiene-acrylonitrile copolymers, rubbery polyesterurethanes, rubbery polyetherurethanes, acrylonitrile-butadiene-1,3-styrene graft polymers or copolymers and so forth, and mixtures of the same. The inorganic pigments and fillers may or may not, previous to addition, to the polymer have been treated with a coating or surface treating agent, such as a hydrolyzable organosilane, such as vinyl trichlorsilane, vinyl trisbetamethoxy-ethoxy silane, and other silanes containing a vinyl group, including the methacrylic ester of gamma-hydroxy trimethoxysilane. Even saturated hydrolyzable silanes are sometimes desirable. Pigments may also be treated with any of the alcohols or polyhydroxy compounds, isocyanates or polyisocyanates, amines or polyamines, etc.

As noted above, the asymmetric alkaline earth metal stabilizers of this invention can be used with other known polyvinyl halide stabilizers to obtain the benefits of such known stabilizers. These other heat and light stabilizers can be any of the cadmium (II), tin (II) and zinc salts of organic acids useful as polyvinyl halide stabilizers, such as cadmium oleate (i.e., cadmium dioleate), cadmium octoate, cadmium stearate, cadmium naphthenate, cadium laurate, cadmium 2-ethyl hexoate, stannous oleate (i.e., stannous dioleate), stannous octoate, stannous naphthenate, stannous stearate, stanous p-tert. butyl bezoate, zinc octoate (i.e., zinc dioctoate), zinc oleate, zinc naphthenate, zinc stearate, and the like, and mixtures thereof, wherein preferably each acid group attached to the metallic radical has from 6 to 18 carbon atoms. Organic phosphite stabilizers (useful among other things to stabilize against oxidation) for polyvinyl halides may also be used, such as those described above (other than the asymmetric stabilizer of this invention), as well as other organic phosphites. Complex organic phosphite salts of cadmium or zinc may also be employed (for example, the reaction product of zinc oxide and dioctyl hydrogen phosphite). Each organic group of these additional organic phosphites preferably has from 4 to 18 carbon atoms. Mixtures of these additional stabilizers can be employed.

These additional stabilizers together with the asymmetric stabilizer of this invention are employed in a minor amount by weight sufficient to stabilize the vinyl halide polymer. In general, the total amount of these stabilizers employed, when the asymmetric stabilizer is used with the metal salts and/or organic phosphites, is from about 0.1 to 10 parts by weight per 100 parts by weight of the vinyl halide polymer. The asymmetric stabilizer, (alkaline earth metal carboxylate-phosphite plus the phenate-phosphite) is used in weight ratios relative to the polymer sufficient to obtain the desired stabilizing action in the vinyl halide polymer. However, it is preferred that when the asymmetric stabilizer is used with one or more of the above metal salts, the ratio by parts by weight of the total amount of the asymmetric stabilizer to the total amount of the cadmium, tin, and/or zinc salt should be from about 1:5 to 5:1. When the asymmetric stabilizer is used with one or more other organic phosphite stabilizers, the preferred ratio by parts by weight of the total amount of the asymmetric stabilizer to the total amount of the organic phosphite is from about 5:1 to 1:1. When mixtures of the metal salts and the organic phosphites are used with the asymmetric stabilizers, it is preferred that these same parts by weight ratios should apply.

The resulting stabilized polymers in suitable amounts can be dissolved in organic solvents and used for solution coating of or casting on cans, fiber containers, cardboard boxes, and the like. The polymers can be made into films or sheets for packaging purposes (bread wrappers), shower curtains and the like; can be printed with decorative colors and used as wall coverings; can be used as a backing material in the manufacture of pressure-sensitive adhesion tapes; can be calendered into woven or non-woven fabric of synthetic or natural fibers to make upholstery material or luggage; can be used in the manufacture of cable jackets or electric wire insulation; can be used to make refrigerator and window gaskets; can be used in making toys and athletic goods, etc. Also, the stabilized vinyl halide polymers of this invention, particularly the vinyl chloride-vinyl acetate copolymers, are particularly useful in making floor tiles, phonograph records and so forth. The stabiized polymers of the present invention are especially useful in making plastisols which can be very liquid casting compositions or nondripping dipping compositions. By use of suitable inert diluents or extenders known to the art, these stabilized resins, usually in the form of plastisols can be made into organosols. Furthermore, these stabilized vinyl halide polymers can also be compounded to form impact-resistant, rigid polyvinyl chloride articles using appropriate amounts of polyurethanes, or styrene-acrylonitrile copolymers and/or butadiene-acrylonitrile copolymers, or acrylonitrile-butadiene-styrene copolymers, etc., in order to make tubing, pipes, trays and so forth.

These compounding ingredients are employed in amounts well-known to those skilled in the art.

The stabilizers of the present invention as well as the other compounding ingredients can be mixed with the vinyl halide polymer on a rubber mill or in a Banbury or extruder at temperatures of 275 to 350° F. or dispersed in the vinyl halide polymer, including plasticizer, pigment, etc., and cast or fused and cured at 275 to 350° F. as known to the art. In general, the temperatures and times used for mixing, fusing and/or curing are those necessary to obtain the desired blending or mixing of the ingredients and desired physical properties without causing appreciable degradation of the vinyl halide polymer, as is well-known to those skilled in the art. They may also be mixed with the vinyl halide polymer in solvent and the solvent evaporated therefrom. They can also be mixed with a suspension or latex of the vinyl halide polymer and the water removed by filtration or after coagulation, but this is not too desirable as it may be difficult to get the desired amount of stabilizer in or on the polymer and some may be lost in the water. These asymmetric stabilizers can also be added initially or during polymerization of the vinyl halide polymer, although care should be exercised since their addition during polymerization may affect conversion rates, molecular weights, particle size, and so forth.

The following examples, in which all parts are parts by weight, will serve to illustrate the present invention with more particularity to those skilled in the art:

EXAMPLE I

Preparation of an in situ formed barium nonylphenate-decyl phenyl phosphite, and barium octoate-decyl phenyl phosphite: 240 parts $Ba(OH)_2$ monohydrate were dispersed in a mix of 127 parts of ethylene glycol monoethyl ether and 91 parts of dipropylene glycol methyl ether and 252 parts of a principally aliphatic hydrocarbon solvent, boiling point over 300° F. at about a temperature of 60 to 70° F., along with 143.5 parts of nonyl phenol and 94 parts of 2-ethyl hexanoic acid (added after adding the $Ba(OH)_2$. The mix is brought to 260° F. for a few minutes, then cooled to about 210° F. before adding 250 parts of decyl diphenyl phosphite. The temperature of the resultant mix rose to 240° F.; external heat was then applied to raise the temperature to 260° F. and digested at 260 F. for about five minutes. The batch is then cooled to 180° F. and filtered. The resultant sol of ethers, hydrocarbon and small excess of phosphite contains about 16.5% barium as barium nonyl phenate-decyl phenyl phosphite.

In the above example, the nonyl phenol used may be substituted in whole or in part by equivalent weights of any of the before-mentioned phenols or substituted phenols or thiophenols with good results, the phenols having an alkyl substituent of 6 to 12 carbon atoms, and especially 8 and 9 carbon atoms in any of the various ortho, meta or para positions on the benzene ring are preferred. The decyl diphenyl phosphite may be substituted in whole or in part by an equivalent weight of any of the triorganophosphites having at least one aromatic group as previously mentioned. The barium hydroxide monohydrate may be substituted in whole or in part by an equivalent weight of the corresponding calcium and/or strontium hydroxide. Barium is preferred, however. All or part of the octoic acid may be substituted by an equivalent weight of other carboxylic acid or acids, as set forth in my aforementioned application.

EXAMPLE II

About 100 parts of emulsion polymerized plastisol grade polyvinyl chloride resin (GEON 121) are mixed with 65 parts of dioctyl phthalate and 2 parts of the resulting filtrate or solution of Example I above, containing about 16.5% barium as barium nonyl phenate-dodecyl phenyl phosphite and barium octoate-nonyl phenyl phosphite. A portion of the resulting plastisol is cast as a film on a highly polished chrome plated steel plate (two square inches) and cured (and fused) at 350° F. for 10 minutes. The cured film is then stripped from the plate, and the surface of the chrome plate is visibly examined for plate-out (a misty appearance or deposit). There is no plate-out. When this procedure is repeated on the same plate for a total of twenty-five times, there is still no plate-out.

When an equivalent weight (based on phosphorus content) of any of the other above-mentioned asymmetric alkaline earth metal phenate-phosphites is substituted for the alkaline earth metal phenate-phosphite in Example II, generally equivalent results are obtained.

While the present invention has been described with particular reference to the prevention of heat degradation of vinyl halide polymers by incorporating therewith a synergistic mixture of the novel asymmetric alkaline earth phenate-phosphite compounds and alkaline earth metal carboxylate compounds disclosed herein, it will be appreciated that minor amounts of such asymmetric compound (alone or with other antidegradants) can be used likewise to retard or prevent degradation of organic substances subject to degradation (by heat, light, ozone, etc.) like the polystyrenes, polyethylene, polypropylene, ethylene-propylene copolymers, ethylene-propylene copolymers containing unsaturation, poly(cis)butadiene-1,3 having various amounts of 1,2 and 1,4 configuration (Ziegler type as well as polybutadienes made by other methods), butadiene-styrene copolymers (resinous and rubbery), acrylonitrile-butadiene-styrene type copolymers and grafts, synthetic natural rubber and or balata (cis/trans Ziegler or other type polymers), butyl rubber, polyester-urethanes, polyetherurethanes, polyether-esterurethanes, polyamides, nylon, butadiene-acrylonitrile type rubbers (Hycar or Paracril), neoprene, polyesters (Paraplexes, Dacron, etc.), chlorinated rubber, silicone rubbers, polyether rubbers and plastics, acrylates and methacrylates and their copolymers, alkyl resins, phenol-formaldehyde type resins, melamine type resins, the cellulosics, the monomers used to prepare such polymers, greases, natural rubber, balata, pine oils, terpenes, lubricating oils, fuel oils, gasoline, vegetable oils, and so forth, either alone, mixed with each other or with the vinyl halide polymer or copolymer. These asymmetric compounds are useful as well as a treating agent for other natural and synthetic organic materials.

It furthermore is to be understood that in accordance with the provisions of the patent laws and statutes, the particular compounds, compositions, products and methods shown and described herein are presented for purposes of explanation and illustration and that various changes and modifications of said compounds, compositions, products and methods can be made without departing from this invention.

What I claim is:

1. A mixture comprising (a) 5 to 95 parts by weight of a compound having the general formula,

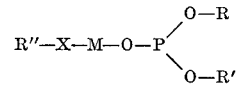

where R and R' are selected from the group consisting of alkyl, cycloaliphatic, aryl, aralkyl, and alkaryl radicals and their halogen-substituted derivatives, where R and R' have from 4 to 18 carbon atoms, where M is selected from the group consisting of barium, calcium and strontium, and where R″—X— is selected from the group consisting of radicals of phenol, substituted-phenols and thiophenols, with (b) 95 to 5 parts by weight of a compound having the general formula

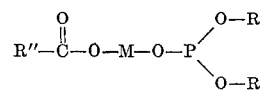

where R and R″ are selected from the group consisting of alkyl, cycloaliphatic, aryl, aralkyl, and alkaryl radicals and their halogen-substituted derivatives, where R has from 4 to 18 carbon atoms, where R″ has from 3 to 17 carbon atoms, and where M is selected from the group consisting of barium, calcium and strontium.

2. A phenate compound according to claim 1a where M is barium.

3. A mixture according to claim 1 wherein barium alkyl phenate-alkyl phenyl phosphite having 4 to 18 carbons in the alkyl group attached directly to an oxygen that is attached directly to phosphorus and up to 18 carbons in the alkyl group attached directly to the benzene ring is at least part of the alkaline earth metal phenate-phosphite present.

4. A phenate compound according to claim 1a where M is calcium.

5. A composition according to claim 1 wherein at least part of said asymmetric material is a calcium alkyl phenate-diphenyl phosphite having up to 18 carbons in the alkyl group.

6. A mixture according to claim 1 wherein barium nonyl phenate-decyl phenyl phosphite is one component of said mixture.

7. A mixture according to claim 1 wherein barium alkyl phenate-bis(nonyl phenyl)phosphite having up to 18 carbons in said alkyl is one component.

8. A phenate compound according to claim 1a, where M is strontium.

9. A mixture according to claim 1 wherein the asymmetric alkaline earth metal phenate phosphite component is present in amounts of 25 to 75 parts by weight and the asymmetric alkaline earth metal carboxylate-phosphite component of said mixture is present in amounts of 75 to 25 parts by weight.

10. A composition useful for the stabilization of vinyl halide polymers comprising (1) a mixture of 5 to 95 parts by weight of (a) a compound having the general formula $$R''-\overset{O}{\underset{\|}{C}}-O-M-O-P\begin{array}{c}O-R\\ \diagdown\\ O-R\end{array}$$

where R and R'' are selected from the group consisting of alkyl, cycloaliphatic, aryl, aralkyl, and alkaryl radicals and their halogen-substituted derivatives, where R has from 4 to 18 carbon atoms, where R'' has from 3 to 17 carbon atoms, and where M is selected from the group consisting of barium, calcium and strontium, with 95 to 5 parts by weight of (b) at least one compound having the general formula $$R''-X-M-O-P\begin{array}{c}O-R\\ \diagdown\\ O-R'\end{array}$$

where R and R' are selected from the group consisting of alkyl, cycloaliphatic, aryl, aralkyl, and alkaryl radicals and their halogen-substituted derivatives, where R and R' have from 4 to 18 carbon atoms, where M is selected from the group consisting of barium, calcium, and strontium, and R''—X— is selected from the group consisting of radicals of phenol, substituted-phenols and thiophenols, and (2) at least one compound selected from the group consisting of "A" and "B," where "A" is at least one compound selected from the group consisting of cadmium, stannous, and zinc salts of carboxylic acids, and where "B" is at least one organic phosphite other than (1), the ratio of No. (1) to No. (2) above being from 1:5 to 5:1.

11. A composition useful for the stabilization of vinyl halide polymers according to claim 10, wherein each carboxylic group attached to the metal of (2) has from 6 to 18 carbon atoms, and wherein the parts by weight ratio of (1) to (2) is about 1:5 to 5:1.

12. A composition according to claim 10 further characterized in that at least one organic phosphite other than (1) of claim 10 is present, and wherein each organic group of said phosphite has from 4 to 18 carbon atoms, and where the parts by weight ratio of (1) to (2) is about 5:1 to 1:1.

13. A composition useful for the stabilization of vinyl halide polymers according to claim 10, further characterized in that each carboxylic acid group attached to the metal of (2) has from 6 to 18 carbon atoms, and there is present (3) at least one organic phosphite other than (1) of claim 10, and wherein each organic group of said phosphite other than (1) has from 4 to 18 carbon atoms, where the parts by weight ratio of (1) to (2) is about 1:5 to 5:1, and where the parts by weight ratio of (1) to (3) is about 5:1 to 1:1.

14. A polymer of a vinyl halide comprising a minor amount by weight and sufficient to retard degradation of said polymer of a mixture of 5 to 95 parts by weight of (a) a compound having the general formula $$R''-\overset{O}{\underset{\|}{C}}-O-M-O-P\begin{array}{c}O-R\\ \diagdown\\ O-R\end{array}$$

where R and R'' are selected from the group consisting of alkyl, cycloaliphatic, aryl, aralkyl, and alkaryl radicals and their halogen-substituted derivatives, where R has from 4 to 18 carbon atoms, where R'' has from 3 to 17 carbon atoms, and where M is selected from the group consisting of barium, calcium and strontium, and 95 to 5 parts by weight of (b) a compound of the general formula $$R''-X-M-O-P\begin{array}{c}O-R\\ \diagdown\\ O-R'\end{array}$$

where R and R' are selected from the group consisting of alkyl, cycloaliphatic, aryl, aralkyl, and alkaryl radicals and their halogen-substituted derivatives, where R and R' have from 4 to 18 carbon atoms, where M is selected from the group consisting of barium, calcium and strontium, and where R''—X— is selected from the group consisting of radicals of phenol, substituted-phenols and thiophenols.

15. A composition according to claim 14 where said mixture of compounds is used in an amount of from about 0.1 to 10 parts by weight per 100 parts by weight of said polymer.

16. A composition according to claim 15 where M is barium.

17. A composition according to claim 16 where barium nonyl phenate-octyl phenyl phosphite is one of the said asymmetric components present.

18. A composition according to claim 15 where M is calcium.

19. A composition according to claim 14 wherein the high polymeric material is a solid polymer of vinyl chloride.

20. A composition according to claim 16 where said mixture comprises barium octyl phenate-octyl phenyl phosphite.

21. A composition according to claim 18 where said mixture comprises barium nonyl phenate-bis(nonyl phenyl) phosphite.

22. A composition according to claim 14 wherein said polymer is a polymer of vinyl chloride and said composition also contains at least one other compounds selected from the group consisting of cadmium, stannous and zinc salts of carboxylic acids, where each carboxylic acid group attached to the metal has from 6 to 18 carbon atoms, and where said mixture of compounds of claim 14 is from about 0.1 to 10 parts by weight per 100 parts by weight of the said polymer of vinyl chloride, and where the parts by weight ratio of asymmetric compounds of claim 14 to said other compound is about 1:5 to 5:1.

23. A composition according to claim 14 which also contains at least one organic phosphite other than the mixture of asymmetric compounds of claim 14, and wherein each organic group of said phosphite has from 4 to 18 carbon atoms, where the total of said asymmetric alkaline earth metal phosphites is from about 0.1 to 10 parts by weight per 100 parts by weight of the polymer, and where the parts by weight ratio of the total asymmetric alkaline earth metal phosphites to said other organic phosphite is about 5:1 to 1:1.

24. A composition according to claim 14 which also contains (1) at least one other compound selected from the group consisting of cadmium, stannous, and zinc salts of carboxylic acids, where each carboxylic acid group attached to the metal has from 6 to 18 carbon atoms, and (2) at least one organic phosphite other than the asymmetric alkaline earth metal phosphites, and wherein each organic group of said organic phosphite has from 4 to 18 carbon atoms, where the total of said asymmetric alkaline earth metal phosphites is from about 0.1 to 10 parts by weight per 100 parts by weight of the polymer, where the parts by weight ratio of the total of said asymmetric compounds to (1) is about 1:5 to 5:1, and where the parts by weight ratio of the total of said asymmetric compounds to (2) is about 5:1 to 1:1.

References Cited

UNITED STATES PATENTS

| | | | |
|---|---|---|---|
| 3,219,605 | 11/1965 | Klemchuk | 260—23 |
| 3,284,386 | 11/1966 | Juredine | 260—23 |
| 3,382,199 | 5/1968 | Scullin | 260—23 |

OTHER REFERENCES

Chevassus et al.: "The Stabilization of Polyvinyl Chloride," 1963, page 11, TP986, V48 C45E.

Scott: "Atmospheric Oxidation and Antioxidants," 1965, pages 332, 333, 341 and 413, QD281 O9S35.

DONALD E. CZAJA, Primary Examiner

R. A. WHITE, Assistant Examiner

U.S. Cl. X.R.

252—400; 260—45.7, 45.75, 45.85